United States Patent [19]

Romagosa et al.

[11] Patent Number: 5,270,359
[45] Date of Patent: Dec. 14, 1993

[54] UINTAITE-DERIVED TONERS AND PRINTING INKS

[75] Inventors: Enrique E. Romagosa, Sandy, Utah; John F. Cooper, Hudson, N.H.; Michael Nuzzolo; Michael Lane, both of Bountiful, Utah

[73] Assignee: American Gilsonite Company, Salt Lake City, Utah

[21] Appl. No.: 960,760

[22] Filed: Oct. 13, 1992

Related U.S. Application Data

[60] Division of Ser. No. 516,012, Apr. 27, 1990, which is a continuation-in-part of Ser. No. 246,467, Sep. 19, 1988, abandoned.

[51] Int. Cl.$^5$ .................. C08L 31/04; C08L 59/00; C08L 67/00; C08L 95/00
[52] U.S. Cl. .................................. 524/64; 524/62; 430/109
[58] Field of Search .................. 524/64, 62; 430/109

[56] References Cited

U.S. PATENT DOCUMENTS

| | | | |
|---|---|---|---|
| 3,427,967 | 2/1969 | Thielen et al. | 101/211 |
| 3,652,315 | 3/1972 | Matsuo et al. | 117/17.5 |
| 3,671,646 | 6/1972 | Kurita et al. | 252/62.1 |
| 4,018,601 | 4/1977 | Hagenbach | 96/1 |
| 4,254,201 | 3/1981 | Sawai et al. | 430/111 |
| 4,554,019 | 11/1985 | Moynihan | 106/27 |
| 4,591,611 | 5/1986 | Jenkins et al. | 524/64 |
| 4,592,988 | 6/1986 | Aldrich et al. | 430/107 |

FOREIGN PATENT DOCUMENTS

| | | |
|---|---|---|
| 60-71675 | 4/1985 | Japan . |
| 0063374 | 1/1988 | Japan . |
| 0944401 | 12/1963 | United Kingdom . |

OTHER PUBLICATIONS

"E R Resins," Industry Evaluation Program, American Gilsonite Co., Sep. 1987.
"E R Resins," R & D Progress Report, American Gilsonite Co., Sep. 1987 (I).
"E R Resins," R & D Progress Report, American Gilsonite Co., Sep. 1987 (II).

*Primary Examiner*—James J. Seidleck
*Assistant Examiner*—I. Zemel
*Attorney, Agent, or Firm*—Townsend and Townsend Khourie and Crew

[57] ABSTRACT

A composition useful in copying and printing is described. In one embodiment, the composition comprises a purified fraction of uintaite and a thermoplastic polymer. Preferably, the composition comprises a maltene-enriched fraction of uintaite derived by solvent extraction, a thermoplastic polymer and a colorant. In another embodiment, the present invention is an electrophotographic method comprising the steps of generating a latent electrostatic image; developing said latent image with a toner comprising a purified fraction of uintaite; and fixing said toner. The present invention is also a printing ink emulsion comprising a maltene-enriched fraction of uintaite.

9 Claims, 1 Drawing Sheet

UINTAITE-DERIVED TONERS AND PRINTING INKS

CROSS-REFERENCE TO RELATED APPLICATIONS

This is a division of application Ser. No. 07/516,012, filed Apr. 27, 1990, which is a continuation-in-part of application Ser. No. 246,467, filed Sept. 19, 1988 now abandoned. This application is also related to Ser. No. 047,846 now abandoned to R. M. Carlson, titled "Method for Converting Lower Grade Uintaite to High Grade Materials". These applications are both assigned to Chevron Research Company.

FIELD OF THE INVENTION

This invention relates to new compositions of matter which are particularly useful in electrophotographic copying and printing. More particularly, this invention relates to a composition comprising a purified fraction of uintaite derived by solvent extraction and having a substantially reduced asphaltene content, combined with a thermoplastic polymer or a colorant. These compositions are particularly useful in toners and inks.

BACKGROUND OF THE INVENTION

Electrophotographic copying is a process where an electrostatic latent image is produced by a strong light flash. A colored, finely-divided powder, a dry toner, is used to develop and transfer this latent image into a visible image, generally on standard, plain paper. See Kirk-Othmer Encyclopedia of Chemical Technology, 3rd Ed. Vol. 8, 1978, pp. 794–826, which is incorporated herein by reference. See also "Pigment Blacks in Toners for Electrophotographic Copying Process", American Ink Maker, July 1987, pp. 18–20, which is incorporated herein by reference.

Although there are a variety of machines with different toner requirements, some of the steps in electrophotography are common to almost all systems. The first step is electrostatic charging or sensitization of the semiconductor photoconductor layer through corona discharge. Then, a latent electrostatic image of the original item to be copied is generated on this photoreceptor surface by exposure to light. This latent image corresponds to the intensity of light and dark areas in the original. This electrostatic image is developed by contact with a toner having an opposite triboelectric charge. The toner particles are then transferred from the semiconductor layer to the image carrier, e.g., the paper. The image is finally fixed, generally by means of heat and/or pressure. Lastly, the photoreceptor is cleaned of toner and neutralized of any residual charge.

A variety of materials have been used as toners in copiers. These are described in the Encyclopedia of Materials Science and Engineering Vol. 2, pp. 1503–1508, 1986, which is incorporated herein by reference. Typically, thermoplastic organic polymers are used along with a colorant and a charge agent. Copolymers of acrylates or methacrylates and styrenes are the primary thermoplastics used in most commercial toners. Charge agents include such diverse components as ammonium salts and dyes. The natural mineral uintaite has been used in toner compositions.

Desirable toner properties include low cost, hardness, friability, hydrophobicity, good adhesion to paper, and a gloss transition temperature of about 60° C. Rheology and charge characteristics must be consistent with the fixing method.

Uintaite is a naturally occurring hydrocarbon mineral. As a natural product, the chemical and physical properties of uintaite vary and depend strongly on its source. Uintaite has also been called "gilsonite" although this usage is incorrect; Gilsonite ® is a registered trademark of American Gilsonite Co., Salt Lake City, Utah. American Gilsonite Co. sells a variety of Gilsonite ® "resins", sometimes identified by their softening points (ring and ball). For example, General Purpose (GP) Gilsonite ® brand resin has a softening point of about 350° F. Higher valued grades of uintaite have lower softening points; these include Gilsonite ® "Selects", for which the lowest softening point is about 290° F. The softening points of these natural uintaites depend primarily on the source vein that is mined when the mineral is produced. Uintaite is described in the Kirk-Othmer Encyclopedia of Chemical Technology, 3rd Ed. vol. 11, 1980, pp. 802–806, which is incorporated herein by reference.

Uintaite is a unique material. It is primarily hydrocarbon in nature, is very shiny and hard, and has a high melt viscosity. Although it is often compared to asphalt, many of its properties clearly differentiate it.

Uintaite has been separated into fractions. For example, sulfuric acid has been used to extract nitrogen containing compounds from uintaite. U.S. Pat. No. 3,414,128 to Baarson et al., describes the use of nitrogenous materials obtained from uintaite in froth flotation. This patent also discloses fractions of uintaite prepared by thermal cracking and distillation.

Uintaite has also been fractionated by solvent extraction. It is believed that samples of these fractions have been available since the 1950's.

Also, bituminous materials, such as asphalts and uintaite, have been used as "extractants" for mixtures containing aliphatic and aromatic hydrocarbon; see U.S. Pat. No. 3,190,934 to Garwin.

As already stated, uintaite has been used in toner compositions. One example of a toner containing uintaite is U.S. Pat. No. 3,652,315 to matsuo et al., which discloses the use of uintaite and carbon black as coloring agents in compositions where toner particles are coated with liquids, such as silicone oil. Another example is U.S. Pat. No. 3,671,646 to Kurita et al., which discloses in Example 4 a liquid developer for electrostatic photography that includes natural uintaite. Still another toner composition that includes natural uintaite is described in U.S. Pat. No. 4,254,201 to Sawai et al. The uintaite is described as a pressure sensitive adhesive substance, a tackifier.

Natural uintaite has also been used in printing inks. Japanese Patent J60071675A to Moroboshi Ink KK describes a low viscosity lithographic printing ink prepared by dissolving uintaite is an oil. U.S. Pat. No. 3,427,967 to Thielen describes low condensate inks comprising high grade uintaite. U.S. Pat. No. 4,773,932 to Gambling teaches a printing ink comprising pigment, oil, tall oil pitch and optionally, gilsonite. This patent teaches that these compositions have reduced rub off relative to conventional inks.

U.S. Pat. No. 4,193,815 to Burris teaches gilsonite (uintaite) emulsion compositions containing 33-95% gilsonite together with a petroleum hydrocarbon of boiling point above about 450° F. (such as diesel oil, gas oil, lubricating oil and asphalt) and a water phase consisting essentially of water and a small amount of emulsifying agent. The emulsifying agents taught, include, among others, the alkali metal salts of higher fatty acids, or mixtures of acids available from animal or vegetable oils. The amount of emulsifier is between 0.05 and about 5% of the total composition weight. These compositions are described as useful for producing insulation board and for printing inks. U.S. Pat. No. 4,282,037, also to Burris, teaches similar compositions.

Additionally, Japanese patent 80 018468-B teaches a printing ink prepared by emulsifying an aqueous solution containing an inorganic acid or its salt with a non-ionic surfactant of 8-18 HLB with a vehicle formed by dissolving one or more resins selected from petroleum resin, hardened rosin, ester gum, tall oil pitch and gilsonite in mineral oil.

All of the above patent teach compositions comprising natural unitaite. However, a number of problems are observed when uintaite is used in toners or inks. These problems are related to the physical and chemical properties of uintaite. For example, uintaite has a very high softening point and very high melt and solution viscosities. These properties make it difficult to use uintaite in the manufacture of toners and inks using standard techniques. Also, uintaite as mined generally contains naturally occurring mineral insolubles which can be problematic during processing and use, especially in inks where the uintaite is used in solution. Furthermore, the viscosity of uintaite in solution increases over time. This viscosity instability makes handling uintaite in solution difficult, and prevents its use in applications where solutions are stored for periods of time.

Moreover, the odor of uintaite has been found objectionable; and its compatibility with and solubility in organic solvents is limited.

A very significant problem with uintaite can be the variability of its properties. Since uintaite is a natural product, its physical and chemical properties depend strongly on its source. Thus, its use, for example in electrophotography, requires constant experimentation and monitoring which significantly reduces its effectiveness and applicability in most conventional copy systems. As the source varies, the properties of the uintaite vary.

It would be advantageous if a composition could be provided that would have the desirable properties of uintaite, for example, its shine, that would not have the disadvantages of uintaite, for example, the undesirably high melt viscosity and hardness, and the viscosity instability in solution, that would be useful in toners.

It would be advantageous if a uintaite-derived composition with predetermined properties could be provided that in combination with a thermoplastic resin, a colorant or both, would be useful for electrophotography or for printing.

It would be advantageous if a single material could be provided that could act as a thermoplastic resin, as a positive charge agent and as a colorant in toner compositions.

Among other factors, it has unexpectedly been found that purified fractions of uintaite can partially replace synthetic polymers in toner compositions, while also providing sufficient charge so that charge agents are not necessary. One object of the present invention is to provide a composition that is useful in electrophotography. Another object of the present invention is to provide compositions useful in printing. Further objects of the invention will become evident to those skilled in the art.

SUMMARY OF THE INVENTION

The present invention is an composition useful in copying and printing. In one embodiment, the composition comprises a purified fraction of uintaite and a thermoplastic polymer. Preferably, the composition comprises a maltene-enriched fraction of uintaite derived by solvent extraction, a thermoplastic polymer and optionally a colorant.

In another embodiment, the present invention is an electrophotographic method comprising the steps of generating a latent electrostatic image, developing said latent image with a toner comprising a purified fraction of uintaite, and fixing said toner.

In another embodiment, the present invention is an emulsion useful in printing inks comprising a maltene-enriched purified fraction of uintaite, rosin, water, and optionally a hydrocarbon oil.

BRIEF DESCRIPTION OF THE DRAWING

The figure shows the viscosity characteristics in ink oil of natural uintaite compared to some of the ER resins useful in this invention as a function of time.

DETAILED DESCRIPTION OF THE PREFERRED EMBODIMENTS OF THE INVENTION

Definitions

Figure 1:
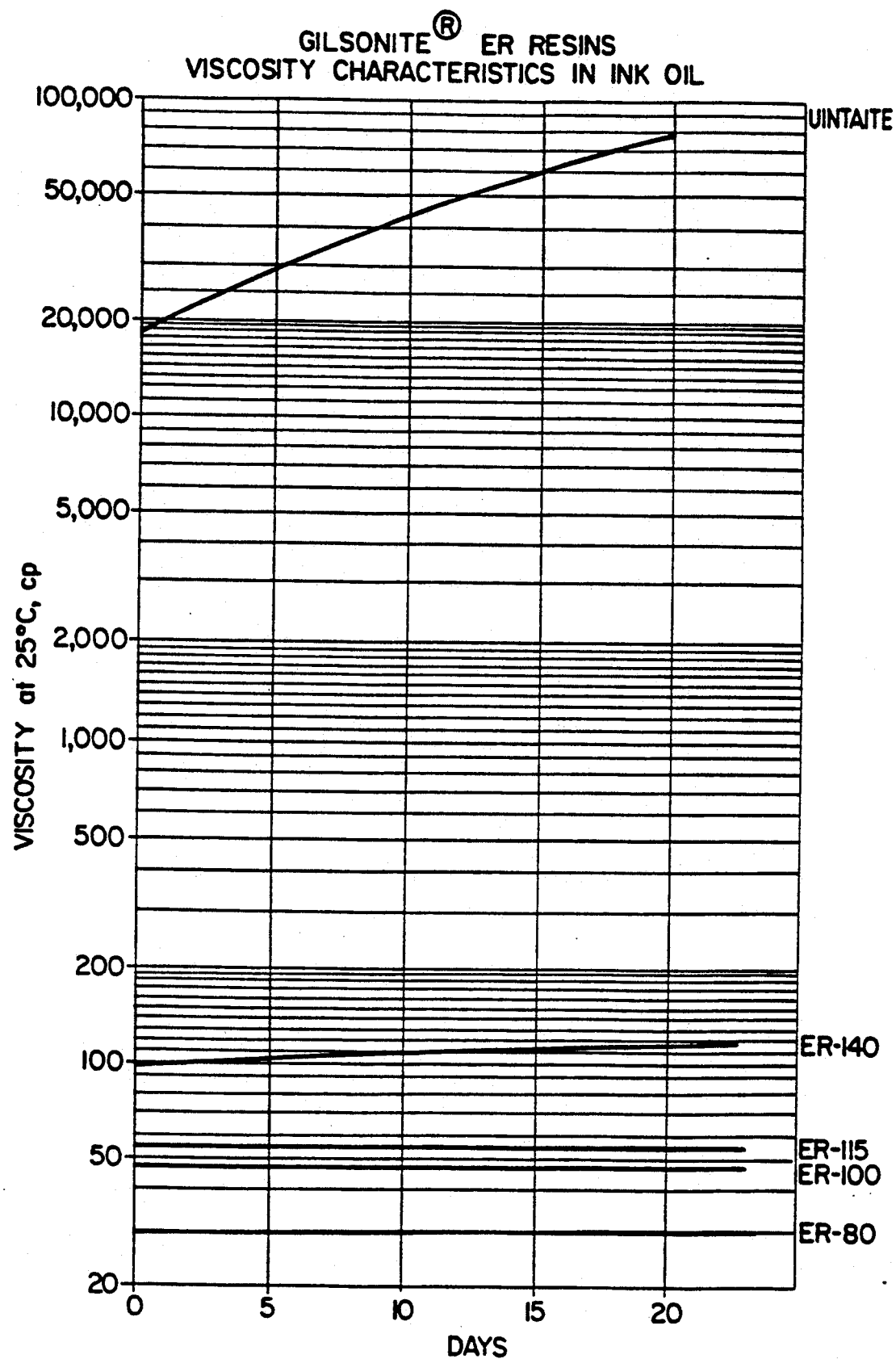

As used herein, the term "uintaite", "Gilsonite ® resin", or "natural uintaite" refers to the naturally occurring hydrocarbon mineral, uintaite. See Kirk-Othmer Encyclopedia of Chemical Technology, 3rd Ed., Vol. 11, pp. 802-806, which is incorporated herein by reference. Gilsonite ® is a registered trademark of the American Gilsonite ® Company, Salt Lake City, Utah.

ER resins are "engineered resins"; the term "ER resin" or "Gilsonite ® ER resin", as used herein, means a purified fraction of uintaite. These fractions are substantially enriched in maltenes or asphaltenes relative to natural uintaite. Merely dissolving uintaite in a solvent in which it is soluble (i.e., a solvent that dissolves greater than about 90% of the uintaite) and filtering this solution does not produce a purified fraction of uintaite as defined herein. Such a simple filtration process does not substantially change the asphaltene to maltene ratio from that of natural uintaite. Therefore it does not produce the asphaltene-enriched and maltene-enriched purified fraction of uintaite useful in this invention.

The term "maltene", as used herein, refers to the fraction of uintaite that is dissolved when finely ground uintaite is contacted with 20 volumes of hot heptane at 80° C. for 1 hour with stirring, and the hot solution is filtered through a 0.8 micron filter. Maltene-enriched fractions of uintaite, such as ER-140 and ER-115, have a weight ratio of maltenes to asphaltenes of greater than about 6; preferably greater than about 15; most preferably these resins are substantially free of asphaltenes, i.e., less than 2 wt. % asphaltenes. Moreover these resins are also substantially free of ash.

Maltene-enriched ER resins as defined herein have softening points below about 140° C., and are substantially reduced in asphaltene content relative to natural uintaite; they have at least 50% fewer asphaltenes than natural uintaite, preferably at least 75% fewer, and more preferably at least 90% fewer. These maltene-enriched ER resins also have reduced mineral-derived insolubles, i.e., ash. These insolubles are below 0.1% by weight, preferably below 0.05%. The maltene-enriched fractions of uintaite useful in this invention comprise at least 60% maltenes, preferably at least 80% maltenes and most preferably at least 90% maltenes. Maltene-enriched ER resins have lower softening points than those of natural uintaite. Solution viscosity, viscosity stability and melt viscosity are also substantially improved over available grades of natural uintaite. The less soluble, high melting, asphaltene-enriched fractions are also called ER resins.

The term "asphaltene", as used herein, refers to the fraction of uintaite that is not soluble when finely ground uintaite is contacted with 20 volumes of hot heptane at 80° C. for 1 hour with stirring, and the hot solution is filtered through a 0.8 micron filter. Asphaltene-enriched fractions of uintaite, such as ER-200, have a weight ratio of maltenes to asphaltenes of less than about 0.25; more preferably less than about 0.15; most preferably these resins are substantially free of maltenes. The asphaltene-enriched fractions useful in this invention comprise at least 75% asphaltenes, more preferably at least 90% asphaltenes.

By the term "toner" is meant an electrostatic ink or an electrostatic toner composition. The term "toners" includes both dry and liquid toners. Dry toners are powders composed of pigment dispersed in a thermoplastic polymer. The powder particles must meet specific criteria. For example, they must be free-flowing; they must have the proper electrical properties and be in the correct particle size range for electrophotography.

The term "imaging process", as used herein, refers to reprography and reproduction processes, such as electrophotography and xerography as well as printing and offset duplication.

Preparing a Uintaite Resin

Solvent extraction methods for heavy hydrocarbons, such as residue, are well known in the art. Commercial processes include, for example, Solvent Deasphalting (SDA), ROSE Supercritical Fluid Technology, Low Energy Deasphalting and Residue Solvent Refining. These processes have generally been used on petroleum residue or asphalts which have softening points of less than about 150° F.

These solvent-extraction or solvent-refining methods can be applied to uintaite to produce purified fraction of uintaite, the ER resins useful in our invention. These resins can be a maltene-enriched fraction of uintaite with substantially reduced asphaltenes, or a highly asphaltene-enriched fraction with substantially reduced maltene content. The maltene-rich fraction thus maintains the desirable properties of uintaite, e.g., the shine, the low sulfur and the high nitrogen, but does not have the disadvantage of uintaite, e.g., the undesirably high melt viscosity and hardness, and the viscosity instability in solution. The separated asphaltene-enriched fraction is also useful. moreover, the asphaltene-enriched fraction can be recombined with the maltene-enriched fraction in varying portions to produce synthetic resins having composition different from natural uintaite.

One preferred method of preparing the ER resins useful in this invention is by solvent extractions. In one embodiment, natural uintaite is slurried with a solvent or mixture of solvents that partially dissolve the uintaite; preferably, these solvents are organic solvents having 3 to 10 carbon atoms; more preferably, the solvent is an aliphatic hydrocarbon having 5 to 8 carbon atoms, most preferably, hexane or heptane or mixtures thereof. This slurry is stirred and preferably heated for a period of time sufficient to dissolve maltenes and then the insoluble asphaltene fraction is separated from the soluble maltene-enriched fraction. Temperatures for this solvent extraction are preferably 60°–175° F., more preferably 70°–120° F. Typical reaction times are from about 5 minutes to about 8 hours, preferably 2 to 4 hours. At the higher temperatures, the higher molecular weight, longer chain length molecules are dissolved, and the softening point increases.

The solvent and, optionally, a portion of the soluble (and distillable) oil is separated from the resulting maltene fraction by heat treatment or contacting with steam to produce the ER resin. Generally the oil fraction comprises less than 5% of the final resin composition.

Another preferred method of preparing the ER resins useful in this invention is disclosed in U.S. Ser. No. 047,846 by R. M. Carlson, "Method for Converting Lower Grade Uintaite to Higher Grade Materials" assigned to Chevron Research Company. This patent application discloses a two-solvent precipitation process wherein uintaite is dissolved in a first organic solvent, such as methylene chloride or an aromatic hydrocarbon, prior to precipitation of asphaltenes by a second organic solvent, such as an aliphatic hydrocarbon. The resulting ER resins are useful in this invention. The Carlson patent application is incorporated herein by reference.

Solvent refining of uintaite results in purified uintaite derived fractions. These Gilsonite ® ER resins can be prepared with predetermined properties. These properties depend on the amount and type of solvent used in the extraction or precipitation steps described above, on the extraction temperature and on the effectiveness of filtration. They also depend on the amount of oil removed, for example, during the solvent removal step. By adjusting the solvent, the reaction time and temperatures, the thermal properties of the resin can be controlled within a few degrees.

ER resins are generally described by their softening points. Typical maltene-enriched ER resins have softening points (or "melt points") in the range of about 175° F. to 285° F., or about 80° C. to 140° C. The maltene-enriched fraction has a lower average molecular weight by vapor pressure osmometry than the natural uintaite or the asphaltene-enriched uintaite. ER resins are named to correspond to their ring and ball softening point in degrees Celsius as measured by ASTM method E-28. Thus, for example, an engineered resin (ER resin) with a softening point of 140° C. is caller ER-140. For toner applications the softening point of the ER resin as measured by ASTM E-28 is preferably in the range of about 105° C. to 140° C. Asphaltene-enriched ER resins have softening points greater than about 195° C.

Toner Compositions

ER resins are useful in imaging processes such as electrophotography and printing. They can be used in combination with colorants, especially carbon black, with magnetic pigments, both in liquid and dry toners, as well as in inks.

We have found quite surprisingly that the addition of small amounts of ER resin to toner formulations greatly increases the tendency of the toner to acquire very high positive triboelectric charge when the toner is combined with common copier carriers.

It is desirable in dry toner applications to have intimate mixtures of the ER resin and the thermoplastic polymer in the form of a finely divided powder. Typically, particles of 1 to 40 microns in size are desired, more preferably, 5-25 microns in size. This powder can be prepared by combining a purified fraction of uintaite with a thermoplastic polymer, optionally a colorant; heating the combination to soften the uintaite and the polymer, and mixing this combination to produce an intimate mixture. The heating step is a melt-mixing step. Preferred ER resins for dry toners have a softening point in the range of 80° F. to 145° C., more preferably 105° C. to 140° C.

Further steps comprising cooling the mixture; and milling the cooled mixture to produce particles having a size of about 1-40 microns, preferably 5-25 microns, can also be used.

Optionally, a colorant, such as carbon black, and other additives are also included.

In the melt-mixing step, the resin polymer and pigment can be combined in an extruder or Banbury mixer, generally at temperatures of 80° to 160° C. Subsequent mixing, if necessary, can be carried out in a rubber mill. After mixing, the cooled toner is crushed and micronized, typically by high-velocity impact from high-velocity fluid jets.

Typical toner compositions include the following components, each serving a unique function: a synthetic or natural thermoplastic polymer, a charge agent, and a colorant. Additional components, such as flow aids, dispersing agents, lubricants, and pressure-sensitive adhesives can also be added.

It has now surprisingly been found that purified fraction of uintaite can be used to replace or partially replace several of these components. The ER resins are particularly effective as charge agents.

The natural or synthetic thermoplastic polymer functions as a carrier and binding agent. It permits fixing of the developed toner image to the paper by fusion. In combination with the Gilsonite ® ER resin, a variety of natural and synthetic thermoplastic polymers are useful in this invention. They include styrene acrylate copolymers, such as styrene n-butyl methacrylate (preferably styrene-rich polymers), styrene n-butyl acrylate, styrene-2-ethyl-hexyl acrylate, styrene-isobutyl methacrylate, and styrene n-butyl methacrylate-co-methyl methacrylate. Other useful thermoplastic polymers are styrene allyl alcohol copolymer; polystyrene; polyesters for example, Atlac 382E; Acrylics, such as B-66; polybutyl methacrylate, such as Elvacite; epoxy resins, such as Epon 1004; polyamides, such as Versamid, ethylene vinyl acetate copolymers; polyethylene resins; polypropylene resins such as Sanyo Viscol 55OP; poly(vinyl butyral); poly(vinylacetates); rosins, such as Pentalyn and Amberol; poly(phenyl-phenol formaldehyde) resins, and the like. Branched or partially cross-linked polymers are also included herein as thermoplastic polymers. Mixtures of polymers can also be used. Styrene acrylic ester copolymers are preferred; more preferably, styrene n-butylmethacrylate copolymers. The ER resins are compatible with these styrene and acrylic-based resins. Charge agents cause the toner to be attracted to the latent image. In addition to the Gilsonite ® ER resin, charge agents useful in this invention include quaternary ammonium compounds, nigrosine dyes, cetyl pyridinium chloride, and the like.

The ER resins are useful in preparing position charge toners; they can decrease the negative charge magnitude of other components in the toner. Moreover, they increase the rate of charging of the toner composition and provide more uniform charging.

The term "colorants" as used herein are organic or inorganic pigments or dyes. Colorants provide the color to the produced image. In addition to the Gilsonite ® resin, colorants useful in the present invention include black colorants such as carbon blacks, either resistive or conductive blacks. Other colorants, such as cyan, magenta and yellow colorants can also be used. These include phthalocyanines, quinacridones and diarylides, to name a few. Carbon black is a preferred colorant.

In single component toners, magnetic pigments, such as iron oxide or magnetite, are useful in our invention.

Other additives for toners are well known and can be used in our invention. They include such diverse compounds as surfactants, foaming agents, and lubricants. These toners can either be used alone in single component toners or combined with carrier beads in dual component developers. Useful carriers include magnetic metals, such as iron, steel and ferrite, as well as glass beads.

We have unexpectedly found that our ER resins can provide or partially provide several of the key functions of the toner compositions. For example, it can partially replace the more expensive synthetic polymers such as styrene-n-butylmethacrylate copolymer used in toner compositions, thus acting as a resin extender. This provides significant cost advantages, since producing ER resins is less energy intensive and less complex technologically than preparing synthetic polymers from monomers. Also, the surprisingly high triboelectric chargeability (Q/M) of the ER resins can make the addition of a charge agent unnecessary. Thus, the ER resin can itself be the charge agent. Moreover, the extremely high gloss and color of these ER resins allow them to act as a colorant for black toners.

Typical toner compositions of our invention contain the following components when an ER resin is used as a partial substitute for the thermoplastic polymer, i.e., as a polymer extender:

|  | Range, % | Preferred Range, % | Most Preferred Range, % |
| --- | --- | --- | --- |
| Polymer | 50-98 | 60-85 | 70-80 |
| ER resin | 0.5-45 | 0.5-30 | 5-25 |
| Colorant | 0-15 | 5-10 | 5-10 |
| Charge Agent | 0-5 | 1-5 | 1-5 |

The preferred ER resins in these compositions are the maltene-enriched fractions of uintaite. Preferred ER resins have softening points of about 105°-145° C. A more preferred resin is Gilsonite ® ER-140. Preferably, the colorant is carbon black.

Typical toner compositions of our invention contain the following components when ER resin is used as substitute for the charge agent:

|  | Range, % | Preferred Range, % |
| --- | --- | --- |
| Polymer | 85-95 | 90-95 |
| ER resin | 0.1-10 | 0.5-5 |
| Colorant | 0-15 | 3-7 |

The ER resins provide high positive charges that can be maintained for surprisingly long periods of time without significant loss of charge. Preferred resins in these compositions comprise maltene-enriched fractions of uintaite having softening points of about 105°–145° C. A more preferred resin is a Gilsonite ® ER-140 resin.

Typical toner compositions of our invention contain the following components when ER resin is used as substitute for the charge transfer agent and as a partial substitute for the polymer:

|  | Range, % | Preferred Range, % |
| --- | --- | --- |
| Polymer | 80–90 | 85–95 |
| ER resin | 0.5–15 | 2–10 |
| Colorant | 0–15 | 3–7 |

Here again, preferred ER resins in these compositions comprise maltene-enriched fractions of uintaite. Preferred resins have softening points of about 105°–145° C. A more preferred resin is Gilsonite ® ER-140 resin.

Thus, it can be seen that the amount of ER resin in the compositions of the present invention can be varied. Typically, the amount of ER resin in these compositions is 0.1 to about 45% of the composition, preferably 0.5 to 25% of the composition, and more preferably 1 to 15%. The amount of polymer in our compositions is generally 50–98% by weight.

The use of ER resins in toners has been found to be particularly advantageous in that it combines in a unique and surprising way the properties of a thermoplastic polymer, a positive charge agent and a colorant for black toners.

The triboelectric chargeability, Q/M, of our ER resins is very high as measured by the oxidized flake iron test. As shown in Table VII, below, Gilsonite ® ER-140 resin provides high positive charge at 5 wt. % or 1 wt. % of the toner composition. These values are well above typical charge agents.

Also, surprisingly high charge stabilities are observed for dry toners comprising ER resins. The charge is as stable as, or more stable than toners containing such standard charge agents as cetyl pyridinium chloride or nigrosine dye. The melt index is a measure of the viscosity of a thermoplastic polymer at a specified temperature and pressure. The maltene-enriched ER resins have a lower melt index than natural uintaite and therefore can be used in toner compositions, where they can provide melt, flow, and fusing characteristics typical of and comparable to commercial dry toners.

Printing Ink Compositions

ER resins are also useful in printing, such as letterpress printing or flexoprinting. Both asphaltene-enriched and maltene-enriched fractions of uintaite are useful for ink compositions. We have found that maltene-enriched uintaite resins, such as ER 115, are especially useful in water-based printing ink emulsions. Using these ER resins instead of natural uintaite has three major advantages:

1. The resulting product is ash free. Those ER resins which are maltene-enriched purified fractions of uintaite have been treated to remove asphaltenes and particulates, which make the printing process easier;
2. The viscosity of maltene-enriched ER resins are significantly lower than that of natural uintaite, so emulsions with water can be prepared more easily; and
3. The softening points of maltene-enriched ER resins are 60°–170° F. lower than natural uintaite, so emulsification can be done at lower temperatures, and therefore lower pressures.

In a preferred embodiment, our emulsion compositions are prepared by combining an oily composition with water. A preferred oily composition for inks comprises a mixture of a maltene-enriched fraction of uintaite with rosin and optionally a hydrocarbon oil. This oily mixture is treated with a solution of base in water to produce an emulsion by methods well known in the art. For example, an oily mixture is prepared from ER 115, a hydrocarbon oil and rosin. This mixture is heated and blended at elevated temperatures so that it flows readily, i.e., in the range of 250° F. to 375° F., most preferably the range of 325°–335° F. This oily mixture is then combined with about an equal volume of an alkali metal or alkaline earth metal hydroxide in water, preferably KOH, in a colloid mill. This aqueous phase is typically preheated, preferably from 80°–180° F., more preferably from about 120°–140° F. The oily mixture and aqueous phase are then combined at temperatures and rates so as not to exceed the pressure limits of the colloid mill. The resulting emulsion preferably has micelles of less than 10 microns, more preferably less than 5 microns. Moreover, it is stable and can be shipped without the emulsion breaking.

Preferred ER resins useful in this invention have softening points in the range of about 75° to about 130° C. An especially preferred resin is ER 80, with a softening point of about 80° C.

Preferred hydrocarbon oils useful in this invention include hydrotreated napthenic oils, such as hydrotreated heavy gasolines and light diesel oils, isoparaffinic hydrocarbons in the mid-distillate boiling range, and mineral oils.

The rosin component useful in this invention is classified as a natural resin, and is preferrably a wood acid rosin. Rosins are mixtures of terpenoids, primarily tetraterpenoids, having various oxygenated pendant groups, primarily carboxylic acid groups. Rosin comprises organic acids, alternately called rosin acids or resin acids in the art. These acids comprise a three-ring fused system with the chemical formula $C_{20}H_{30}O_2$. These rosin acids comprise abietic-type and pimaric-type resin acids. These structures generally have a carboxylic acid function and a double bond. Description of rosins can be found in *McGraw-Hill Encyclopedia of Science and Technology*, 6th ed., Vol 15, p. 551, which is incorporated herein by reference. Additionally, it is anticipated that modified rosin, such as maleic acid modified rosin, would also be useful in this invention.

Preferred rosins useful in this invention are derived from tree saps and related fluids, generally from pine trees. Preferred rosins are gum rosin, tall oil rosin and wood rosin. Wood rosin is most preferred.

The ratio of components, ER resin, oil and rosin, in the oily mixture is described in Table A, where the quantities are in weight percents. It is important to balance the amount of ER resin, oil and rosin to achieve good flow properties, especially viscosity, for the oily mixture at emulsification temperatures.

TABLE A

| Ratio of Components in Oily Mixture for Preparing Emulsions | | | |
|---|---|---|---|
| | ER Resin, % | Oil, % | Acid Rosin % |
| Broad | 40-75 | 0-35 | 10-35 |
| Preferred | 50-70 | 10-30 | 15-30 |
| Most Preferred | 55-65 | 20-25 | 18-23 |

These amounts depend on the softening point of the ER resin. Compositions comprising resins with higher softening points require more oil.

Emulsification with basic water results in neutralization of the rosin acids to produce rosin acid salts or soaps. Potassium, calcium and zinc are preferred neutralizing agents; potassium is most preferred. Generally, the pH is adjusted to be basic, e.g., a pH of about 11.5. Surprisingly, attempts to emulsify with sodium hydroxide did not yield stable emulsions.

The amount of the oily mixture in the resulting aqueous emulsion is preferably in the range of 35-75 wt % oily mixture, more preferably in the range of 40-60 wt %, the remainder being primarily water. In the preferred range, these emulsions are oil-in-water emulsions. These emulsions are especially useful in flexographic printing inks and newsprint.

Additionally, emulsion formulations comprising an ER resin, an oil and a surfactant are particularly advantageous.

The emulsions of this invention provide a substitute for the common acrylic emulsions used in water based inks, and can be combined at about 10-80 wt % emulsion in these ink compositions, preferably 30-60 wt %.

As discussed above for toners, these emulsion compositions are also especially useful when colorants are added, especially carbon black.

Additionally, ER resins are also useful in non-emulsion printing inks. Here they are used in combination with hydrocarbon oils and colorants. U.S. Pat. No. 4,554,019 to Moynihan shows the use of natural uintaite in inks. Using an ER resin in place of the natural uintaite provides improved ink compositions. ER resins are also envisioned as useful in laser printers.

The asphaltene-rich fraction of uintaite is also useful as a wetting agent for carbon black. When black colorants, such as carbon black, are combined with ER-200 or ER-210, the mixture can be formulated as an ink more rapidly than when only carbon black is used.

An Electrophotographic Process

As discussed above, the new compositions of this invention are surprisingly useful in electrophotographic processing. A preferred electrophotographic process using the composition of this invention comprises the steps of generating a latent electrostatic image, developing said latent image with a toner comprising a purified fraction of uintaite, and fixing said toner.

Preferably, the purified fraction of uintaite in this process is a maltene-enriched fraction. It is preferred that the toner further comprises a thermoplastic polymer and, optionally, a colorant. A preferred colorant is carbon black. Optionally, magnetic pigments or carriers can be added.

As ER resins have a positive charge, it is preferred that the latent electrostatic image has a negative charge. However, ER resins can be used to counteract excessive negative charge from the toner polymer, when the electrostatic image has a positive charge.

The invention will be better understood in light of the following specific examples, which are merely illustrative and should not be construed as limiting in any respect, as will be evident to those skilled in the art.

EXAMPLES

EXAMPLE 1

Preparation of ER Resins

Fifteen wt % ground Gilsonite ® brand uintaite (American Gilsonite Company G.P. Grade) with a softening point of about 350° F. was slurried in heptane solvent and heated for four hours at 95° F. The mixture was then filtered through a 1.5 micron filter to give a soluble maltene-enriched fraction in heptane and an insoluble asphaltene-enriched fraction (about 60 wt %). The asphaltene-enriched fraction (ER-200) had a softening point of about 200° C.

The heptane solution was heated in a resin kettle at about 350° F. to remove solvent, followed by sparging with steam to remove the last of the heptane and some of the oil. After stripping the maltene-enriched product had a ring and ball softening point of about 240° F. (115° C.). This ER-115 resin had a stable solution viscosity when dissolved at 30 wt % in Magie 470 oil; after 28 days, the viscosity increased less than 10%.

Some of the properties of ER resins produced by this procedure are shown and are compared with natural uintaite in Tables I and II.

TABLE I

| | Natural uintaite, Gilsonite ® G.P. | ER-115 | ER-200 |
|---|---|---|---|
| Carbon, wt % | 84.0 | 85.0 | 84.6 |
| Hydrogen, wt % | 10.0 | 10.7 | 9.8 |
| Nitrogen, wt % | 3.3 | 2.7 | 3.5 |
| $^{13}C$ NMR | | | |
| Aliphatic C, % | 68.3 | 70.3 | 68.9 |
| Aromatic C, % | 31.7 | 29.7 | 31.1 |
| VTGA, 1000° F.-, % | 3 | 4 | 2 |
| 1000-1200° F., % | 3 | 8 | 2 |
| Softening Point, °F. (Ring and Ball) ASTM E-28 | ~350 | ~240 | >390 |
| $C_7$ Asphaltenes, wt % | ~60 | >5 | >90 |
| Microcarbon residue | 28.9 | 23.5 | 33.7 |

TABLE II

| Compatibility of Gilsonite ® ER Resins | | | | |
|---|---|---|---|---|
| | ER-80 | ER-115 | ER-200 | Gilsonite ® G. P. Uintaite |
| Alkyd Resins | C | C | P | C |
| Epoxy Resins | C | P | I | P |
| Hydrocarbon Resins | C | C | C | C |
| Phenolic Resins | C | C | P | C |
| Polyesters | P | I | I | I |
| Polyamides | P | I | I | I |
| Rosin Derivatives | C | C | P | C |
| Styrene Resins | C | C | P | C |
| EVA Copolymers | C | C | P | C |
| SBS Rubber | C | C | C | C |
| Chloroprene Rubber | C | C | C | C |
| Silicone Resins | C | C | P | C |

C = Compatible
P = Partially Compatible
I = Incompatible

The solubility of ER resins is shown in Table III. As can be seen, the lower softening point materials have improved solubility in ink oil, oxygenated solvents and aliphatic solvents.

TABLE III

Solubility of Gilsonite ® ER Resins

| | ER-80 | ER-115 | ER-200 | Gilsonite ® G. P. Uintaite |
|---|---|---|---|---|
| Ink Oils | S | S | P | S |
| Aliphatic Solvents | S | S | I | P |
| Aromatic Solvents | S | S | S | S |
| Chlorinated Solvents | S | S | S | S |
| Alcohols | P | I | I | I |
| Esters | P | P | I | I |
| Ketones | P | P | I | I |

S = Soluble
P = Partially Soluble
I = Insoluble

EXAMPLE 2

Preparation of ER-140

By adjusting the solvent, the extraction temperature the effectiveness of filtration and the amount of oil removed, maltene-enriched uintaite fractions can be obtained with higher or lower softening points than Example 1.

A procedure similar to that of Example 1 was used to prepare Gilsonite ® ER-140 resin. The solvent used was heptane, the heating temperature was 190° F. and the sample was filtered through a 25-micron filter. After solvent removal, the resulting maltene-enriched fraction of uintaite had a softening point of 140° C.

The viscosity characteristics of ER resins and natural uintaite over time are shown in the Figure. The solutions were prepared by dissolving 30 wt. % solids in Magie 470 oil, an ink oil, and measuring the viscosity overtime with a Brookfield Model RVT viscometer. As can be seen, the ER-140, ER-115, ER-110, and ER-80 resins all have much lower solution viscosities than natural uintaite, and their viscosity increase over time is much lower.

EXAMPLE 3

Solubility Characterization of ER Resins

A sequential elution fractionation (SEF) method was used to characterize uintaite and two ER resins, ER-200 and ER-140, prepared in a manner similar to Examples 1 and 2. The samples were separated into four SEF fractions on the basis of their solubility in a sequence of four solvents.

A sample of approximately one gram was weighed out accurately and dissolved in about 5–10 ml of methylene chloride. The solution was introduced onto "inert" support material (approximately 200 g of a 50:50 w/w mixture of glass beads and Chromosorb-T) in a one-liter pear-shaped flask. The flask was placed on a Rotovap and was rotated slowly at ambient temperature and under vacuum to remove the ethylene chloride. The dry, sample-coated support material was then packed into a glass liquid chromatographic column (25 mm ID×50 cm, Altex). The column was connected to a programmable solvent delivery system (Model 590, Waters), an automatic solvent selection valve (Waters), a UV/VIS diode-array detector (Model 8451A, Hewlett-Packard), and a programmable fraction collector (Foxy, ISCO). Four solvents (in sequence: n-pentane, cyclohexane, toluene, and a mixture of methylene chloride and methanol 4:1 v/v) were pumped through the column at a constant flow rate of 20 ml/min. to produce four solvent-derived fractions. The effluent was monitored by a UV/VIS diode-array detector which collects spectra in the range from 350 nm to 650 nm at 30-second intervals. Solvents were evaporated from the fractions and weight percent yields of the recovered material were determined gravimetrically. Results are reported as weight percent of SEF-1, SEF-2, SEF-3, and SEF-4 fractions in Table IV. Elemental Analyses of the SEF fraction are shown in Table V. As can be seen from Table IV, the uintaite, the maltene-enriched uintaite fraction and the asphaltene-enriched uintaite fraction have very different solubilities and compositions.

TABLE IV

SEQUENTIAL ELUTION FRACTIONATION (SEF) RESULTS

| | Concentration, Wt. % | | |
|---|---|---|---|
| Fraction* | Gilsonite ® GP | Asphaltene-rich ER Resin (ER-200) | Maltene-rich E Resin (ER-140) |
| SEF-1 | 36.5 | 14.7 | 76.6 |
| SEF-2 | 24.6 | 18.4 | 20.0 |
| SEF-3 | 27.6 | 42.9 | 1.3 |
| SEF-4 | 6.1 | 11.1 | 1.8 |

*SEF-1 = n-Pentane-soluble.
SEF-2 = Cyclohexane-soluble and n-pentane-insoluble.
SEF-3 = Toluene-soluble and cyclohexane-insoluble.
SEF-4 = Methylene chloride:methanol (4:1 v/v) soluble and toluene-insoluble.

TABLE V

ELEMENTAL ANALYSIS OF "SEF" FRACTIONS

| | | Concentration, Wt. % | | |
|---|---|---|---|---|
| "SEF" Fraction | Analysis | Gilsonite ® GP | (ER-200) | (ER-140) |
| SEF-1 | Carbon | 85.6 | 85.0 | 83.8 |
| | Hydrogen | 10.9 | 10.6 | 10.7 |
| | Nitrogen | 2.6 | 2.8 | 2.5 |
| | H/C Atomic Ratio | 1.51 | 1.48 | 1.52 |
| SEF-2 | Carbon | 85.1 | 84.2 | 85.2 |
| | Hydrogen | 9.8 | 9.8 | 10.0 |
| | Nitrogen | 3.6 | 3.5 | 3.4 |
| | Sulfur | 0.24 | 0.25 | 0.23 |
| | H/C Atomic Ratio | 1.37 | 1.38 | 1.40 |
| SEF-3 | Carbon | 85.0 | 85.0 | ND* |
| | Hydrogen | 9.6 | 9.6 | ND |
| | Nitrogen | 3.8 | 3.8 | ND |
| | Sulfur | 0.28 | 0.30 | ND |
| | H/C Atomic Ratio | 1.34 | 1.34 | ND |
| SEF-4 | Carbon | 83.9 | 84.9 | ND |
| | Hydrogen | 9.4 | 9.5 | ND |
| | Nitrogen | 3.8 | 3.9 | ND |
| | H/C Atomic Ratio | 1.33 | 1.33 | ND |

*ND - Not determined because of insufficient sample.

EXAMPLE 4

ER Resin as Charge Agent

This example compares toner compositions made using Gilsonite ® ER resins as charge agents. This formula was chosen so as to be similar to that used in a Xerox 1075 copier. Two levels of ER-140 resin were used, 1 and 5 wt. %. For the purposes of comparison, two samples were made without ER resin, one of which used cetyl pyridinium chloride, and the other a nigrosine dye as the charge agents.

All of these toner formulations were compounded on a 3"×8" 2-roll mill (front roll heated, back cooled) for 15 minutes. They were jet-milled in a Trost TX mill at an air pressure of 80 to 85 psi, with a feed speed of 3 gm/min.

The formulations are as follows:

TABLE VI

| Component | Toner I | Toner II | Toner III | Toner IV |
|---|---|---|---|---|
| Piccotoner 1292* | 93 | 93 | 89 | 91.5 |
| Regal 300 Carbon | 6 | 6 | 6 | 6 |
| Gilsonite ® ER-140 | — | 1 | 5 | — |
| Cetyl Pyridinium Chloride | 1 | — | — | — |
| Nigrosine Dye | — | — | — | 2.5 |

*Hercules 1292 is believed to be a 58:42 styrene-n-butyl methacrylate copolymer.

The charge, Q/M, was measured for these formulations, as a function of time, using 3% toner on Kynar coated sponge iron. The results are shown in Table VII. The percent of charge remaining after 4 hours compared to after 30 seconds is also shown.

TABLE VII

| Time | I | II | III | IV |
|---|---|---|---|---|
| 30 Seconds | +33.2 | +27.9 | +48.4 | +38.4 |
| 1 Hour | +29.1 | +28.8 | +47.6 | +20.8 |
| 4 Hours | +18.8 | +20.5 | +40.0 | +26.1 |
| % Charge After 4 hrs. | 57 | 74 | 83 | 68 |

The charging characteristics, especially the charge stability, of toners comprising ER resins was found to be surprisingly high. Toners II and III of our invention show is especially good performance in photocopying.

EXAMPLE 5

ER Resin as a Thermoplastic Toner Polymer

This example demonstrates the ability of Gilsonite ® ER resins to be used in toners as a partial substitute for the thermoplastic polymers. ER-115 and ER-140 were evaluated. Resin properties are shown below.

|  | ER-115 | ER-140 |
|---|---|---|
| Melt Index 150°/2160 g | 30.1 | 11.5 |
| Melt Pt (Koffler), °C. | 85 +/− 5 | 115 +/− 5 |
| Q/M (Oxidized Flake Iron) | +35.6 | +32.2 |

The ER-140 was selected to make and evaluate toner formulations. Two formulations were made to evaluate the product as a partial replacement for standard toner polymers. These formulations, with their key properties as toners, are listed below:

| Toner A | Wt. % |
|---|---|
| Polymer (Styrene-n-butyl methacrylate) | 67 |
| Gilsonite ® ER-140 | 20 |
| B-90 | 8 |
| Carbon | 5 |
| Melt Index (150°/2160 g) | 8.3 |
| Soft Pt (Koffler) | 65 |
| Melt Pt (Koffler) | 118 |
| Q/M (100 Spherical Steel) | +11.7 @ 3.4% toner |

This toner composition is usefl in photocopying. It shows excellent charge properties.

| Hot-Roll Fusing Toner | |
|---|---|
| Polymer (Res 277 from Hercules) | 70 |
| Gilsonite ® ER-140 | 20 |
| Carbon | 7 |
| Viscol 550P | 3 |
| Melt Index (150°/2160 g) | 9.0 |
| Soft Pt (Koffler) | 73 |
| Melt Pt (Koffler) | 122 |

| Hot-Roll Fusing Toner | |
|---|---|
| Q/M (Oxide Flake Iron) | +28.6 |

EXAMPLE 6

Preparation of ER Emulsions For Printing Inks 160 grams of KOH (85.9% Assay) was added with stirring to hot tap water. The resulting basic water solution was 0.306 molar in KOH and had a pH of 13.5. The temperature of the mixture was about 130° F.

An oily mixture. was prepared by combining 60 weight percent ER 115, a maltene-enriched purified fraction of uintaite, with a softening point of 115° C., with 22 weight percent Sunprint HP 750, a hydrocarbon oil sold by Sun Refining, Philadelphia, PA, and 18 weight percent Dixie B Rosin sold by DeRidder Chemical Company, Whistler, Alabama. Sunprint HP oil has a viscosity of 9.8 cst at 100° C., an average molecular weight of about 380 and comprises about 41% aromatics, 58% saturates and about 1% polar compounds, as measured by ASTM, D2007. The Dixie B Rosin is a hard brittle wood-based rosin with a high acid number (90–110 meg/liter) a saponification number of 140, and a softening point of about 100° C. It is preferably used as flakes or in pulverized form. It has a very low viscosity, at elevated temperatures, i.e., 245 cst, (which is about 270 centipoise) at 300° F.

The oily mixture was heated to 330° F. and combined with about an equal volume of the basic water in a Charlotte Colloid emulsion mill. The mill was run continually, with a residence time in seconds to produce a stable emulsion. The resulting emulsion can be used in newsprinting; it is low misting when applied to paper and produces hard, nontacky, final film which does not bleed through newsprint paper.

COMPARATIVE EXAMPLE 7

In a manner similar to Example 6, a 0.3 molar solution of NaOH was prepared and combined with the oily mixture of Example 6 under similar temperatures and conditions. The resulting combination of components did not form a stable emulsion.

Having described our invention, as related to the specific embodiments laid out above, it is our intention that the invention not be limited by any of the details of description, unless otherwise specified herein. We intend that our invention be broadly construed within the spirit and scope as set out in the following claims.

What is claimed is:

1. A dry toner composition, comprising:
   a. 0.1 to about 45 weight percent of a purified fraction of uintaite enriched in maltenes or asphaltenes relative to natural uintaite;
   b. a thermoplastic polymer; and
   c. a colorant.

2. A composition as described in claim 1, wherein said colorant is carbon black.

3. A composition as described in claim 1, wherein said thermoplastic polymer is a styrene acrylic ester copolymer.

4. A composition as described in claim 1, wherein said thermoplastic polymer is styrene n-butylmethacrylate copolymer.

5. A dry toner composition, comprising:

a. a maltene-enriched fraction of uintaite with a weight ratio of maltenes to asphaltenes of greater than about 6 derived by solvent extraction with an aliphatic hydrocarbon solvent;
b. a styrene acrylic ester copolymer; and
c. a black colorant.

6. A toner composition as described in claim 5, wherein said maltene-enriched fraction has a softening point in the range of 80° C. to 145° C.

7. A toner compost-ion as described in claim 6, wherein said maltene fraction has a softening point in the range of 105° C. to 140° C.

8. A toner composition as described in claim 5, wherein said copolymer is styrene n-butylmethacrylate.

9. A toner composition as described in claim 5, wherein the amount of said maltene-enriched fraction in said composition comprises 0.5 to 15 percent by weight of said composition.

* * * * *